United States Patent Office 3,139,762
Patented July 7, 1964

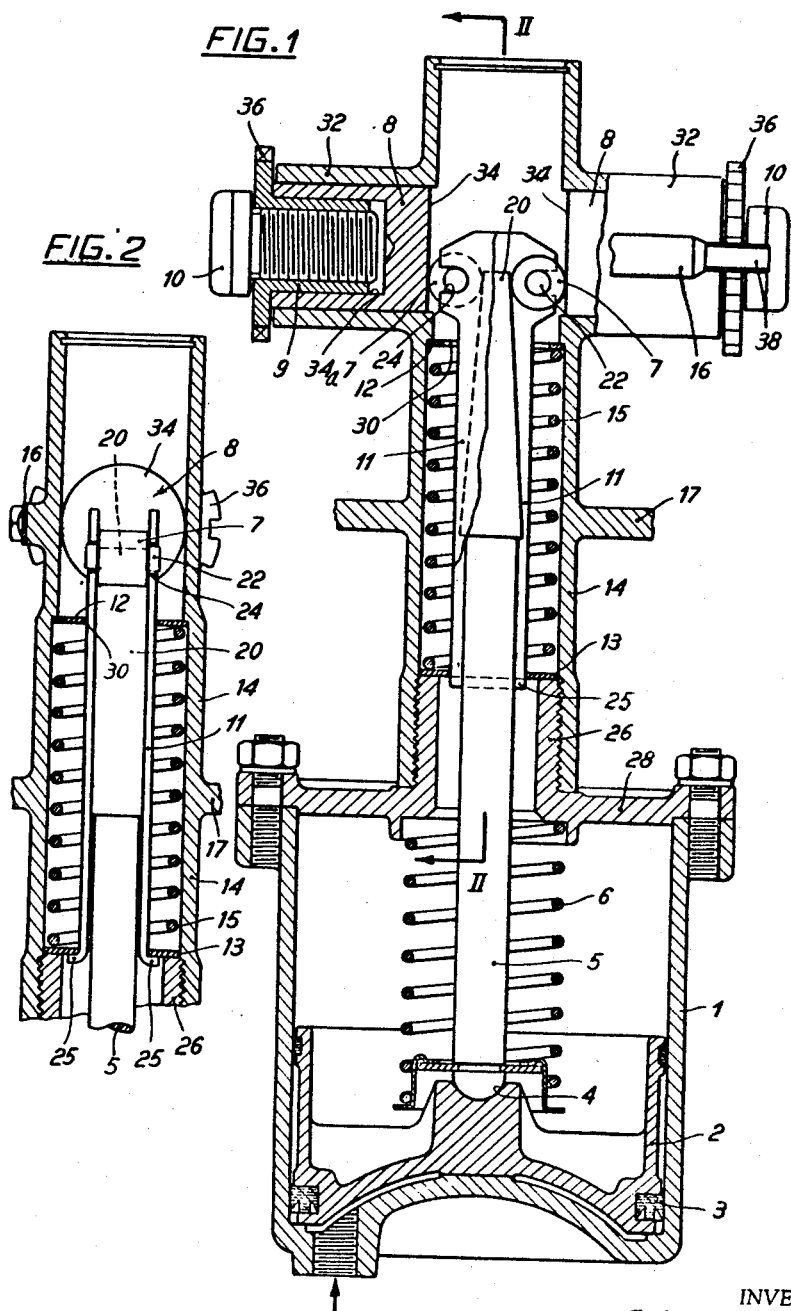

3,139,762
FLUID PRESSURE PISTON ACTUATOR
Giuseppe Alfieri, Milan, Italy, assignor to Fabbrica Italiana Magneti Marelli S.p.A., Milan, Italy, a corporation
Filed June 5, 1961, Ser. No. 114,960
Claims priority, application Italy June 24, 1960
5 Claims. (Cl. 74—110)

The present invention relates to a control device which is adapted to exploit the reaction of external forces for obtaining concomitance with the applied force, a force required for divaricating the shoes of expanding brakes by employing low fluid pressure and realizing a device that is extremely simple mechanically, and which is subjected to minimal mechanical stresses, while at the same time being capable of high efficiency and an absolute certainty of operation.

In accordance with the invention, the braking device comprises essentially a fluid-actuated cylinder and piston assembly which includes a piston rod connected to the piston at one end and having its other end provided with a wedged-shaped end. Associated on either side of the wedge-shaped end of the piston rod and movable therewith are a pair of roller means which are arranged to be laterally displaced upon the axial displacement of the piston rod. Actuated by the lateral displacement of the roller means are a pair of opposed divaricator piston means. The movement is such that the divaricator piston means are laterally displaced with respect to the longitudinal translation of the piston rod and roller carried thereby upon the displacement of the connected piston by fluid pressure. Means are interposed between the piston rod and the roller means to dampen longitudinal displacement of the roller means upon the initial surge of fluid pressure into the piston and cylinder assembly. Also means are provided for adjusting the initial transverse relationship or setting of the divaricator piston means to compensate the wear of the brake lining.

Therefore, an object of this invention is to provide a relatively simple and positive fluid actuating expansion type braking device.

Another object is to provide in a fluid actuating braking device dampening means for resisting axial displacement of the piston rod and associated roller means upon the initial surge of fluid pressure.

Still another object of the invention is to provide a braking device with divaricating piston means which are displaced in opposed transverse directions in response to longitudinal translation of the driving piston and its connected rod.

Other features and advantages will become more readily apparent when considered in view of the drawings, in which:

FIG. 1 is an axial section view of the device in accordance with this invention; and FIG. 2 is a sectional view of the device taken along line 2—2 of FIG. 1.

Referring to the drawings, the control device of this invention comprises a housing including a pneumatic cylinder portion 1, an upper conduit portion 14, and a cover 28 connecting the conduit portion 14 to the cylinder portion 1. As shown, the cover 28 is suitably bolted to the flange of the cylinder portion 1. The cover is also provided with an upright threaded boss portion 26 to which the upper housing 14 is screwed. Disposed in the cylinder portion 1 is a piston 2. In a niche or recess 4 formed in the upper end of piston 2 there is disposed the spherical end of a piston rod 5. Suitable packing rings 3 are operatively associated with the piston 2. The seating of the piston rod 5 in recess 4 is assured by a spring 6. As shown, the other end of the piston 5 extends upwardly through the conduit 14 and it is provided at its upper end with an upwardly and inwardly tapering wedge-shaped end as indicated at 20.

In accordance with this invention the upper end of conduit 14 is provided with oppositely disposed cylindrical bosses or cylinder-forming means 32. A divaricating piston means 8 is reciprocally disposed in each cylinder means 32. As shown, the inner end 34 of each of the respective divaricating pistons 8 is formed as a flat vertical surface, whereas the other end of each piston means 8 has a recess 34a formed therein. A pair of actuating roller means 7 are arranged so as to be operatively associated with the piston rod 5 and with each of the divaricating piston means 8. As shown in FIG. 1 in the rest or neutral position of the related component parts, the upper end of the wedge-shaped piston rod is adapted to lodge between the two rollers 7. The rollers 7, in turn, are engaged in contact with the smooth surfaces 34 of the respective divaricating piston means 8. As shown, the rollers 7 are supported within conduit 14 by means of a pair of oppositely disposed roller supports or arms 11. The respective supports or arms 11 are disposed on opposite sides of the piston rod 5 and the lower end of arms 11 are supported by an apertured disc 13 which rests on the shoulder portions defined by the end of the threaded boss 26 of cover 28. The lower ends of the respective arms 11 project through the aperture of disc 13 and are laterally bent, as indicated at 25, so as to be held in place to the disc 13. The other ends of the support arms 11 are extended upwardly through an aperture 30 in disc 12. As shown, the upper end of each arm 11 is provided with opposed recesses or notches 24 for receiving the roller pivots 22 for supporting same.

Disposed about the roller support arms 11 and between the mounting discs 12 and 13 is a compression spring 15, the purpose of which will be hereafter set forth.

In accordance with the invention, the play forming between the divaricating piston means and a brake drum upon which the same is adapted to operate on account of wear is compensated for by adjusting means which consist of an internally threaded sleeve 9 provided with a notched flange 36 and cooperating with screw 10. As shown, the cylindrical portion of the sleeve 9 is fitted into the recess 34a of the respective piston means 8. Connected to the heads of screw 10 rest the free ends of the brake jaws. Thus to accommodate for axial displacement of the jaws with respect to the divaricating piston means, the respective sleeve is rotated to displace the adjusting screw 10 and thereby take up the play resulting from wear. To maintain the adjusting sleeve 9 and screw 10 in an adjusted position, spring means 16 is provided. As shown, the spring means consists of a flat spring which is suitably connected to the conduit portion 14 of the housing at one end and has at its free end a ratchet 38 which is adapted to engage one of the notches of the flange 36. Thus, the spring 16 and ratchet end 38 thereof hinders any rotation of the sleeve, while at the same time, it will not interfere with the axial displacement of the sleeve 9 in conjunction with the transverse movement of the divaricating piston means 8.

In the form of the invention illustrated it will be noted that the tapering end or wedge-shaped end 20 of the piston rod 5 is disposed between the paired rollers 7, and that the piston rod 5 is guided by means of the support arms 11. The arrangement is such that the pair of arms 11, together with rod 5, can oscillate in union within predetermined limits in a plane on which the axis of the pistons 8 lie. This is possible because the aperature of the disc 12 is rectangular.

In operation, the spring 15 interposed between discs 12 and 13 functions to normally maintain the discs in their at rest positions as seen in FIG. 1. Also, the spring 15 functions as a damper allowing a limited axial displacement of the arms 11, the rollers 7 connected thereto, and the mounting disc 13, when the wedge-shaped end of the piston rol 5 is quickly displaced by piston 2. That is when the compensated air is first fed into cylinder 1, the air will act a certain instantaneous impulse on piston 2, and consequently also on wedge-shaped end 20 of the piston rod. Under such conditions, it is not always possible for the wedge-shaped end 20 to immediately displace or pass between rollers 7 which operate on the ends 34 of the divaricating piston means 8. Consequently there is a tendency for the piston rod to carry along therewith, i.e., to displace the rollers 7 in a longitudinal direction a predetermined amount. Consequently, with the arrangement described, this longitudinal displacement of the roller means 7 upon the initial impulse or injection of fluid air into the piston cylinder 1 is resisted by the compression spring 15. For this reason, the tapered end 20 of the piston rod can laterally displace in a gradual manner the divericating piston means 8. Thus what occurs is that the rollers 7 and consequently the piston means 8 are transversely displaced due to the interaction of both the compressed air acting on the piston 2 longitudinally displacing the piston rod 5 connected thereto, and secondarily by the influence of spring 15. The spring 15 further functions to normally return the disc 13 back into its initial position, together with that of the rollers 7 and arms 11 connected thereto. Thus the rollers function to slide on the surface 34 of the piston 8. By the sending compressed air into the chamber of the cylinder 1, the piston 2 is displaced so that the piston rod 5 is pushed longitudinally and upwardly between the two rollers 7. The arrangement is such that the rollers 7 are driven from a rest position in both a longitudinal direction as they roll on the surfaces 34 of the divaricate piston means 8 and in a transverse direction as a result of the variation in the thickness of the wedge end 20. In this manner, the divaricating piston means 8 are pushed in opposite outward direction by a force directly proportional to the air pressure upon the active face of the piston 2 and inversely proportional to the angle of the piston rod wedge-shaped end 20. The longitudinal displacement of the roller 7 is then equal to one-half of the longitudinal displacement of the cuneiform end of piston rod 5.

The eventual wear difference between the lining of the two jaws is balanced by the ability of rod 5 to oscillate about its articulated end with piston 2.

Although the invention has been described in detail, it will be understood that the description thereof is intended to illustrate rather than restrict, as many structural details are susceptible to modification and change without departing from the spirit and scope of the invention:

What is claimed is:

1. Brake actuating apparatus comprising, in combination, a fluid pressure actuator including a first cylinder and a first piston movable therein; a pair of axially spaced and aligned oppositely directed second cylinders having a common axis substantially perpendicular to the axis of said first cylinder; a pair of second pistons each mounted in a respective second cylinder, said second pistons having opposed facing inner end surfaces which are substantially planar and extend in substantially parallel diametric planes; a piston rod secured to said first piston and having an operating end extending between said facing inner end surfaces, said operating end having opposed longitudinally tapered surfaces each facing a respective inner end surface of a second piston; a pair of rollers each engaged between a respective one of said tapered surfaces and the adjacent second piston end surface for rolling along the engaged surfaces; means mounting said rollers for conjoint movement along the engaged surfaces upon longitudinal movement of said piston rod; damping means restraining such conjoint movement of said rollers to provide for longitudinal movement of the operating end of said rod relative to said rollers to spread said rollers to move said second pistons outwardly in said second cylinders; and means for connecting said second pistons to braking means.

2. Brake actuating apparatus, as claimed in claim 1, in which said rollers' mounting means comprises arm means extending longitudinally of said piston rod, said rollers being mounted in the outer end of said arm means; said damping means including a spring seat secured to the inner end of said arm means and a second spring seat fixed against movement and positioned adjacent the outer end of said arm means, and a spring embracing said arm means and disposed between said spring seats.

3. Brake actuating apparatus, as claimed in claim 1, in which said first cylinder includes a cylinder head having a tubular extension extending therefrom, said second cylinders communicating with said tubular extension; said piston rod extending through said first cylinder head and through said tubular extension; said damping means being disposed within said tubular extension.

4. Brake actuating apparatus, as claimed in claim 3, including a pair of laterally spaced elongated arms disposed on opposite sides of said piston rod, said arms consituting the means mounting said rollers and said rollers being mounted at the outer ends of said arms; a spring seat anchored to the inner ends of said arms; a second spring seat anchored in said tubular extension adjacent but spaced inwardly of the outer end of said arms; and a compression coil spring disposed between said first and second seats and constituting said damping means.

5. Brake actuating apparatus, as claimed in claim 1, in which each of said second pistons is substantially cup-shaped; said connecting means comprising a sleeve rotatably mounted in the cup-shaped recess in each of said second pistons and internally threaded, and a connecting element threaded into each sleeve; whereby, upon rotation of said sleeves, the effective axial position of said connecting element in the respective cylinders can be adjusted.

References Cited in the file of this patent
UNITED STATES PATENTS

| | | |
|---|---|---|
| 2,247,374 | Hawley | July 1, 1941 |
| 2,389,405 | Birchfield | Nov. 20, 1945 |
| 2,501,578 | Pointer | Mar. 21, 1950 |
| 2,757,640 | White | Aug. 7, 1956 |
| 2,965,073 | Alfieri | Dec. 20, 1960 |